(12) United States Patent
Smith

(10) Patent No.: US 9,290,215 B2
(45) Date of Patent: Mar. 22, 2016

(54) HIGH TONNAGE TRAILER COMBINATION, TRAILER COMPONENTS, AND METHOD OF USE

(71) Applicant: Francis V. Smith, Bozeman, MT (US)

(72) Inventor: Francis V. Smith, Bozeman, MT (US)

(*) Notice: Subject to any disclaimer, the term of this patent is extended or adjusted under 35 U.S.C. 154(b) by 643 days.

(21) Appl. No.: 13/667,322

(22) Filed: Nov. 2, 2012

(65) Prior Publication Data

US 2013/0058755 A1 Mar. 7, 2013

Related U.S. Application Data

(62) Division of application No. 12/453,192, filed on May 1, 2009, now Pat. No. 8,322,965.

(60) Provisional application No. 61/071,505, filed on May 2, 2008.

(51) Int. Cl.
| | |
|---|---|
| *B62D 33/02* | (2006.01) |
| *B62D 53/06* | (2006.01) |
| *B60D 1/14* | (2006.01) |
| *B60D 1/48* | (2006.01) |
| *B60P 3/06* | (2006.01) |
| *B62D 53/00* | (2006.01) |
| *B62D 61/10* | (2006.01) |
| *B60P 1/44* | (2006.01) |

(52) U.S. Cl.
CPC ............... *B62D 53/061* (2013.01); *B60D 1/14* (2013.01); *B60D 1/483* (2013.01); *B60P 1/4471* (2013.01); *B60P 3/062* (2013.01); *B62D 53/00* (2013.01); *B62D 53/067* (2013.01); *B62D 61/10* (2013.01)

(58) Field of Classification Search
CPC .................................. B62D 33/02; B62D 21/14
USPC .................. 296/26.03, 26.08, 26.12; 410/44; 280/656
See application file for complete search history.

(56) References Cited

U.S. PATENT DOCUMENTS

| | | | | |
|---|---|---|---|---|
| 1,310,604 | A | | 7/1919 | Burgess |
| 1,996,695 | A | | 4/1935 | Bigley, Jr. |
| 2,491,044 | A | * | 12/1949 | Holland ..................... 280/656 |
| 3,021,155 | A | | 2/1962 | Sherman, Jr. |
| 3,041,082 | A | | 6/1962 | Burkdoll |
| 3,605,928 | A | | 9/1971 | Loesch |
| 3,698,734 | A | * | 10/1972 | Drake ......................... 280/656 |
| 3,913,933 | A | * | 10/1975 | Visser et al. ................ 280/656 |
| 4,096,961 | A | | 6/1978 | Rocco |
| 4,119,224 | A | * | 10/1978 | Moody ........................ 414/537 |
| 4,358,133 | A | * | 11/1982 | Stucky ......................... 280/656 |
| 4,570,967 | A | * | 2/1986 | Allnutt ........................ 280/656 |
| 4,695,087 | A | * | 9/1987 | Hollrock ...................... 296/14 |

(Continued)

*Primary Examiner* — Jonathan Snelting
(74) *Attorney, Agent, or Firm* — Clark & Brody

(57) ABSTRACT

A trailer combination and trailer components are designed to provide dual functionality in terms of hauling a very high tonnage piece of heavy equipment and the ability to continue to haul more typical pieces of heavy equipment. To accomplish this task, a trailer auxiliary is provided that is adapted to connect to a typical low boy trailer. The trailer auxiliary is equipped with mechanisms to provide a bed assembly that is designed to link to the low boy trailer so that the bed assembly and bed of the trailer auxiliary receive the high tonnage piece of equipment. The trailer auxiliary can be equipped with ramps to interface with the trailer and auxiliary to facilitate the loading of the heavy equipment. The trailer combination also includes a hauling vehicle for each of the low boy trailer and auxiliary, with a spacing bar assembly mounted to one of the vehicles to link the vehicles together when hauling the trailer and the auxiliary.

9 Claims, 8 Drawing Sheets

(56) References Cited

U.S. PATENT DOCUMENTS

| | | |
|---|---|---|
| 5,256,024 A | 10/1993 | Ross |
| 5,295,442 A | 3/1994 | Carpenter |
| 5,419,577 A | 5/1995 | Murray |
| 5,435,586 A | 7/1995 | Smith |
| 5,678,838 A | 10/1997 | Taylor |
| 5,924,754 A * | 7/1999 | Kuhns ........................ 296/26.15 |
| 6,199,894 B1 * | 3/2001 | Anderson ..................... 280/638 |
| 7,287,947 B2 | 10/2007 | Smith |
| 2004/0150188 A1 | 8/2004 | Smith |
| 2007/0277695 A1 | 12/2007 | Sells |

* cited by examiner

HIGH TONNAGE TRAILER COMBINATION, TRAILER COMPONENTS, AND METHOD OF USE

This application is a Divisional of U.S. Ser. No. 12/453,192 filed on May 1, 2009, which claims priority under 35 U.S.C. §119(e) based on 61/071,505 filed on May 2, 2008.

FIELD OF THE INVENTION

The present invention is directed to a high tonnage trailer combination and components, and particularly to the combination of a low boy trailer and trailer auxiliary, which when combined, permit the hauling of high tonnage equipment while still retaining the functionality of the low boy trailer for hauling lower tonnage equipment.

BACKGROUND ART

In the mining industry, low boy trailers are often used to move heavy equipment such as shovels and the like from one location to another. Typically, this equipment is in the weight range of up to 800 tons. However, certain shovels weigh in excess of 1000 tons and these trailers are incapable of moving such equipment. Thus, the mine is limited to moving this type of heavy equipment on its own, which takes an inordinate amount of time and hampers mining productivity.

Low boy trailers to haul high tonnage equipment have been proposed to the mining industry in the past. These trailers have been proposed with the capability of hauling up to 1500 tons, e.g., a mining shovel. However, these trailers have not been accepted by the mines for a number of reasons. A low boy trailer designed to haul equipment in the 1500 ton range is about 38 feet wide, which is much greater in width than the 24 foot wide hauling vehicles. The overall length of approximately 171 feet for such a trailer is also impractical.

In addition, the cost of the equipment cannot be justified for the few utilizations of the trailer over time. Such a trailer runs millions of dollars and mine operations cannot justify the high cost of such a trailer for its limited use.

In addition, these 1500 ton capacity trailers require a primary mover and a jeep. However, a primary mover and jeep combination is not practical for use as a tow truck. It is also too long and cumbersome for everyday use to utilize with lower tonnage trailers.

Thus, a need still exists to create a means to move this high tonnage equipment in an economical way so that the cost of acquiring this capability will be acceptable to mine operators. The present invention solves this need by the creation of a trailer combination that combines a low boy trailer designed to haul the majority of the heavy equipment used at a mine but is specially modified with a trailer auxiliary that, when coupled with the modified low boy trailer and modified hauling vehicles, permits heavy equipment, e.g., a 1500 ton mining shovel (incapable of being towed with present day low boy trailers) to be moved.

SUMMARY OF THE INVENTION

One object of the invention is to provide a trailer combination that permits the moving of high tonnage equipment, while still maintaining the flexibility to move equipment of lesser weight.

Another object of the invention is a method of moving the high tonnage equipment using the trailer assembly of the invention.

The inventive trailer assembly includes a number of components that are each uniquely modified to meet the goals of the invention.

The components of the trailer combination include a low boy trailer, which is designed to haul equipment of a first tonnage range. This low boy trailer has a hitch, trailer bed, and trailer wheels. The hitch is adapted to connect to a hitching mechanism on a trailer hauling vehicle.

A second component of the trailer combination is a trailer auxiliary. This auxiliary is designed to link to the low boy trailer and provide a trailer bed for the high tonnage equipment to be hauled. The trailer auxiliary has a frame with a pivotable shovel bed, hitch, and trailer wheels. The trailer auxiliary has means to link the shovel bed to the low boy trailer so that the trailer auxiliary and low boy trailer in tandem provide a high tonnage trailer for hauling equipment incapable of being hauled by either one alone.

In addition to the low boy trailer and trailer auxiliary, a pair of hauling vehicles are needed to tow the trailers. A first hauling vehicle is used to hitch to the low boy trailer and a second hauling vehicle is used to hitch to the trailer auxiliary. The second hauling vehicle is specially adapted with means for connecting to the first hauling vehicle, and particularly to the hitching mechanism on the first hauling vehicle. It is also desirable to include the necessary controls on the second hauling vehicle to coordinate the hitching and hauling operation when the high tonnage equipment is being moved. The first hauling vehicle can be modified to connect to the second hauling vehicle or existing features of the hauling vehicle can be used for the connection.

In use, the trailer auxiliary is connected to low boy trailer so that the shovel bed of the auxiliary is placed over the center line of the low boy trailer. The bed of the auxiliary is configured so that the heavy equipment is aligned with the main frame of the auxiliary. In this way, the center line of each trailer provides the support for the high tonnage equipment. Ramps are positioned at the hitch end of each of the low boy trailer and the trailer auxiliary and the high tonnage equipment is loaded onto the linked trailer and auxiliary. The hauling vehicles are then positioned next to each other for the respective hitching to the trailer and auxiliary. The hauling vehicles are linked together and the hitching to the trailer and auxiliary is completed so that the two hauling vehicles can tow the trailer and auxiliary and move the high tonnage equipment to its desired location.

The invention provides several unique advantages that permit the mine operator to have the capability of hauling high tonnage equipment at only the cost of the trailer auxiliary, modifications to an existing low boy trailer, and modifications to the hauling vehicle intended to tow the trailer auxiliary. Modifications could also be made to the hauling vehicle intended to tow the low boy trailer. Other advantages are described below.

DESCRIPTION OF THE PREFERRED EMBODIMENTS

FIGS. 1B and 2-9 show one preferred embodiment of the invention. However, as explained below, several of the features and functions of the preferred embodiment can be accomplished in alternative ways so that the specific means and other features of the Figures are not intended to be the sole manner in which the aim of the invention can be obtained.

As noted above, one aspect of the invention includes: (1) the trailer auxiliary; (2) the trailer auxiliary in combination with the low boy trailer as an assembly; (3) the combination of the hauling vehicles, the trailer and the auxiliary; (4) and the method of hauling the heavy equipment. Other features of the invention include the spacing bar assembly that links and maintains the positional relationship between the hauling vehicles as well as the unique arrangement of the loading ramps for use during the hauling operation.

Figure 1A:
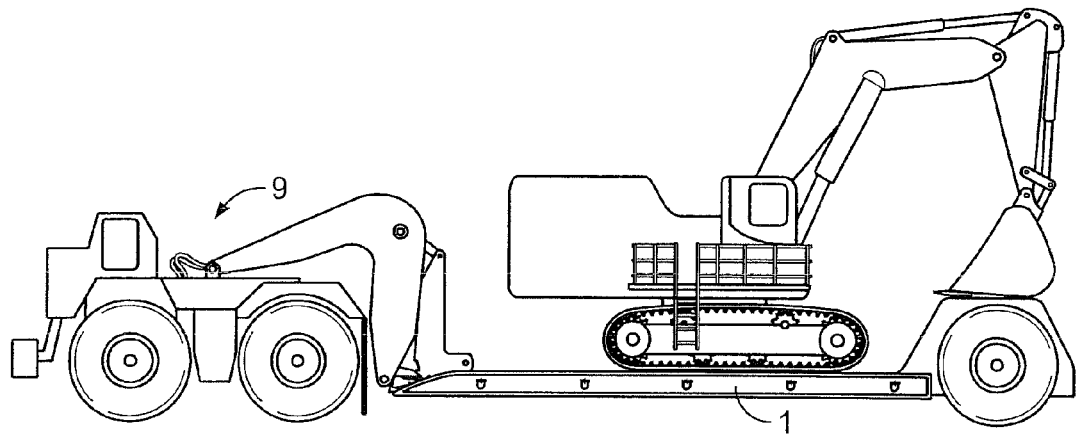
FIG. 1A shows a schematic of a prior art low boy trailer and a hauling vehicle.
Figure 1B:
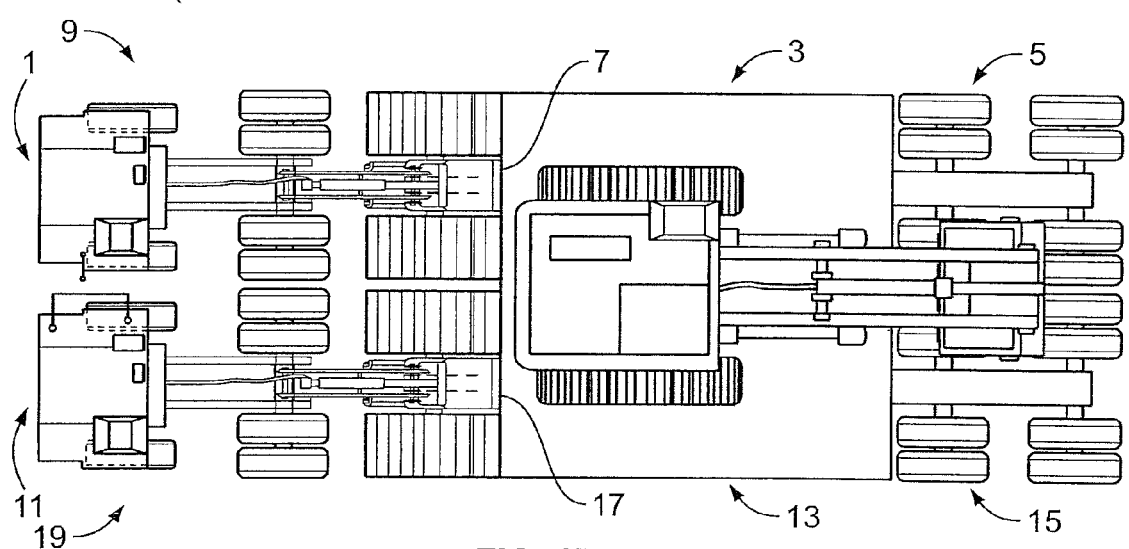
FIG. 1B shows a schematic of the trailer assembly of the invention in an exemplary use.
Figure 1C:
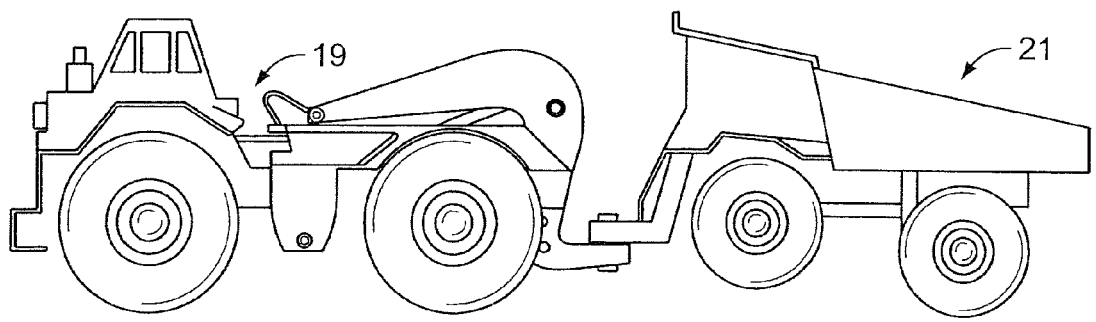
FIG. 1C showing a prior art hauling vehicle functioning as a two truck for a disabled vehicle.

With reference to FIGS. 1A-1C, the assembly 10 is depicted in a schematic fashion. The low boy trailer 1 is shown with its trailer bed 3, trailer wheels 5, and hitch 7. The basic design of this trailer is shown in U.S. Pat. No. 7,287,947 to Smith, which is incorporated by reference. The first hauling vehicle 9, which is considered to be the secondary hauler, is also depicted hitched to a prior art low boy trailer 1 in FIG. 1A. The hitching of the first hauling vehicle 9 and the trailer 1 can be any type. A preferred type is the gooseneck/grabhook hitching mechanism disclosed in U.S. Pat. No. 5,435,586 to Smith (the grab hook patent), which is also incorporated by reference herein.

The trailer auxiliary 11 is also shown with its bed 13, wheels 15, and hitch 17. The second hauling vehicle 19 (characterized as the primary) is also shown. The hitching between the vehicle 19 and auxiliary 11 can also be any type but it is preferred to use the hitching used in the Smith grab hook patent noted above.

FIGS. 1B and 1C also show the uses of the hauling vehicles 9 and 19. For example, the secondary hauling vehicle 9 can tow lower tonnage heavy equipment on the trailer 1 as is the common practice in the mining industry. The primary hauling vehicle 19 can also be used in the same fashion or as a tow truck for a disabled vehicle 21, see FIG. 1C. FIG. 1B shows the inventive trailer assembly with a high tonnage piece of equipment being hauled.

Figure 2A:
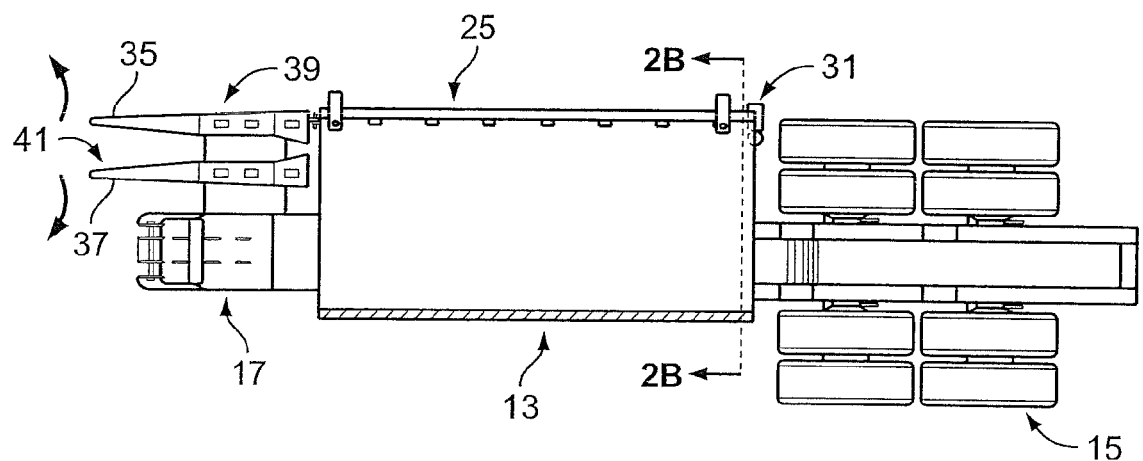
FIG. 2A shows a schematic drawing of the trailer auxiliary.
Figure 2B:
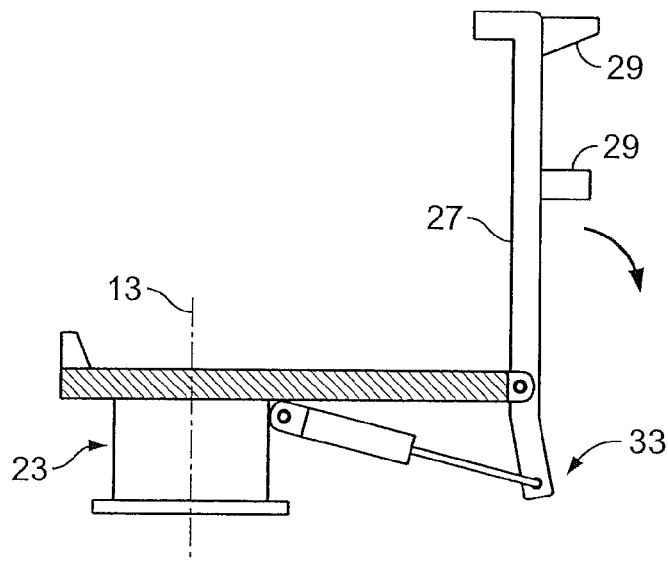
FIG. 2B shows a sectional view along the line II-II of FIG. 2A.
Figure 4:
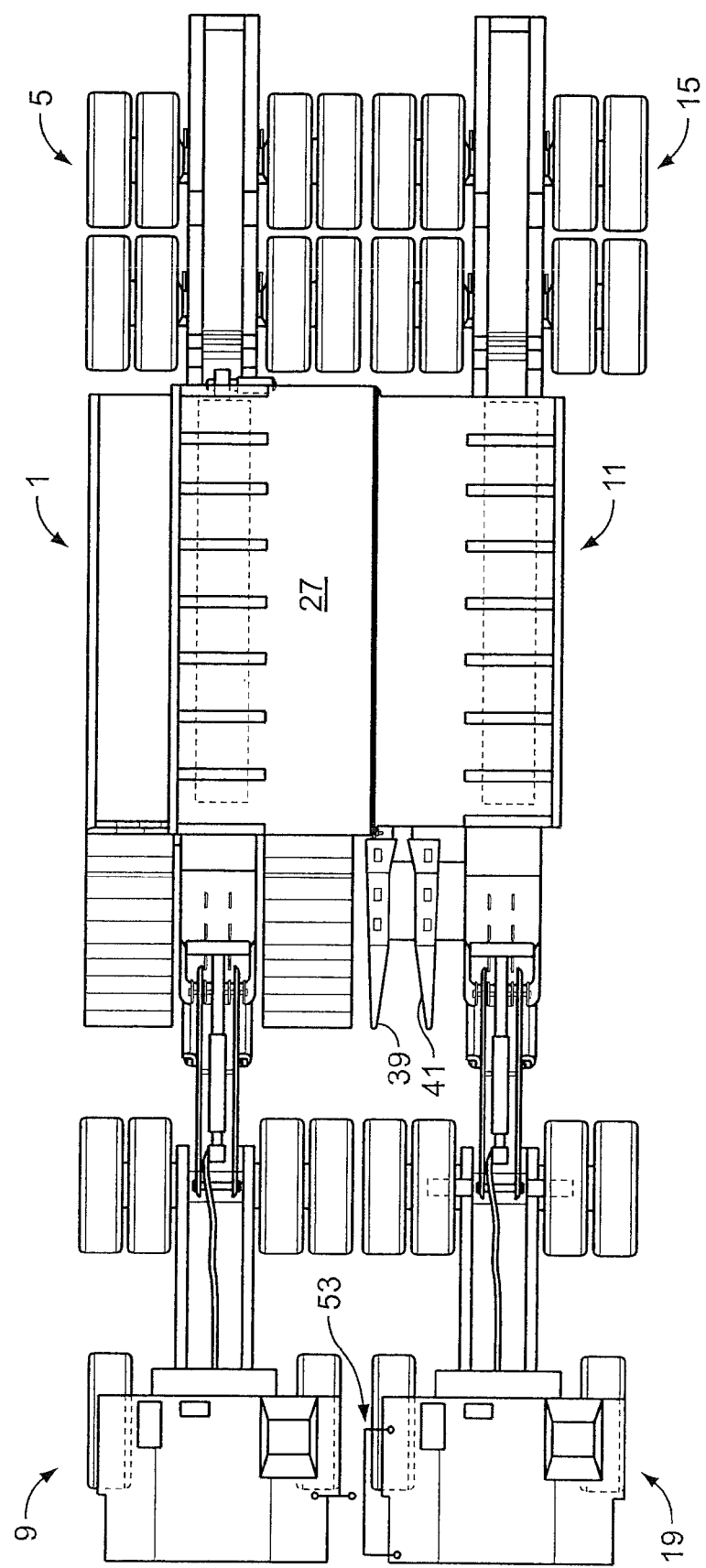
FIG. 4 shows the combination of the trailer auxiliary and the low boy trailer shown in FIG. 3 in an attached mode.

FIGS. 2A and 2B show the auxiliary 11 with its bed 13 mounted on its main frame 23, which is aligned with a center line of the auxiliary 11. A shovel bed assembly 25 is shown that is pivotally and longitudinally mounted to the bed 13. The shovel bed assembly 25 has a bed 27, bed guides 29, and low boy trailer grab hook mechanism 31. The bed assembly 25 has a pivoting mechanism 33, which allows the bed 27 to be in a storage position as shown in FIG. 2B and an operative position as shown in FIG. 4. The bed guides 29 and grab hook mechanism 31 work to link the low boy trailer 1 and auxiliary 11 together as described below.

The auxiliary 11 can also include the ramps necessary for loading of the equipment. The ramps are shown as the low boy trailer ramp assembly 35 and the auxiliary ramp assembly 37. The ramp assembly 35 includes a ramp 39, which is pivotally mounted to the auxiliary 11. The ramp 39 is shown in the storage position, i.e., vertical, in FIG. 2A, and pivots toward the low boy trailer 1 when the trailer 1 is linked to the auxiliary 11. Ramp assembly 37 is similarly constructed with ramp 41, which is pivotally mounted to the auxiliary 11. The difference between the two assemblies 35 and 37 is the length of the pivot arm, since the travel of the ramp 39 to cover the hitch of the trailer 1 is greater than the travel of the ramp 41 to cover the hitch 17 of the auxiliary. It should be noted that each ramp is designed to be positioned along the respective center lines or main frames of the trailer and auxiliary. This distributes the weight of the high tonnage equipment along the main frames of the trailer and auxiliary. While incorporating the ramps with the trailer auxiliary 11 makes the loading operation more convenient, the ramps could be supplied separate from the auxiliary if so desired. Thus, the ramps would not be pivotally linked to the auxiliary 11 but stored somewhere else or elsewhere on the auxiliary and positioned in place using some equipment for the loading operation. It is quite advantageous to incorporate the ramps 39 and 41 into the auxiliary 11 so that they are readily available for use in the hauling operation. The pivoting arrangement is also beneficial since no other additional equipment is needed to position the ramps in place. While a particular pivoting arrangement is shown, other mechanism could be used to position the ramps in their appropriate places to enable loading of the heavy equipment onto the trailer 1 and auxiliary 11.

Figure 3:
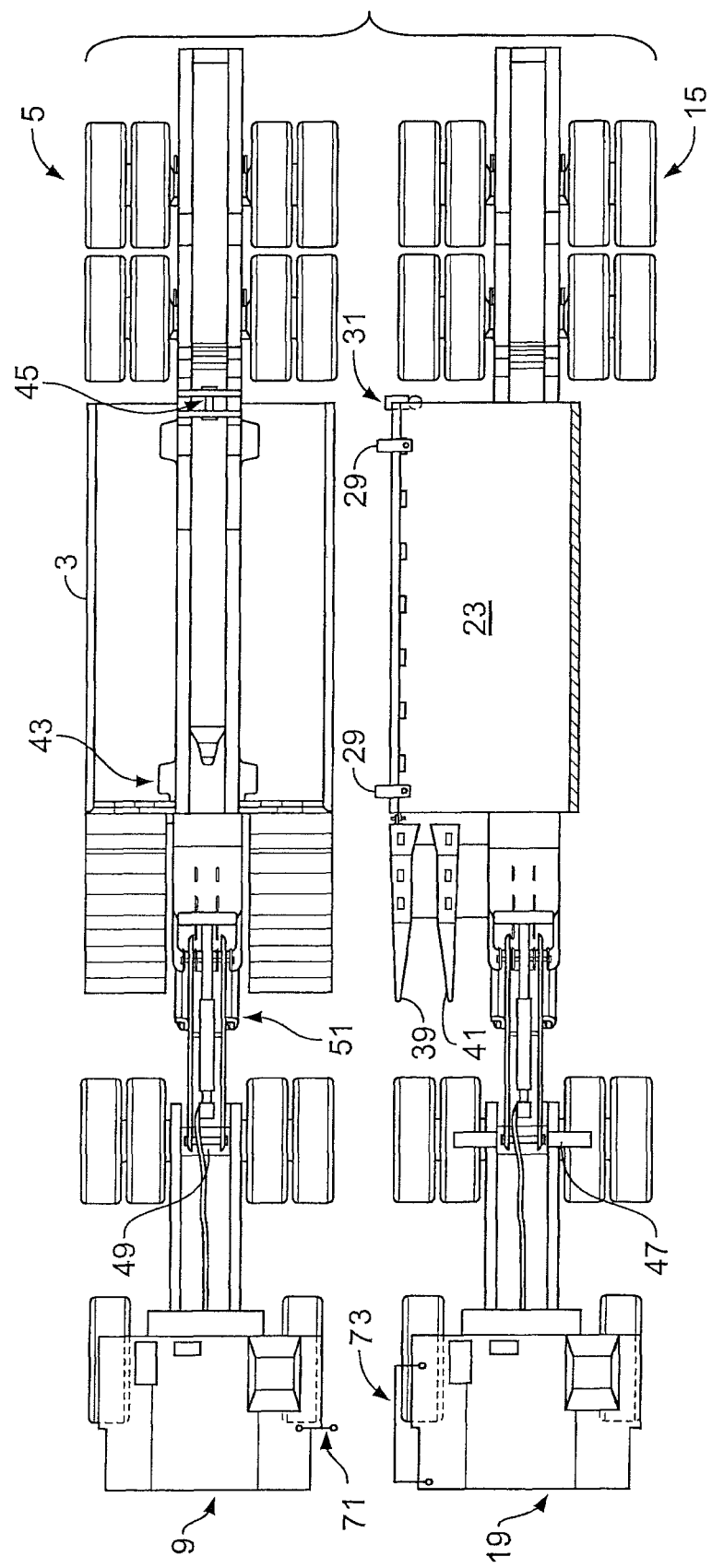
FIG. 3 shows the combination of the trailer auxiliary and the low boy trailer in an unattached mode.

FIG. 3 shows the trailer 1, auxiliary 11, hauling vehicle 9, and hauling vehicle 19 as well as the various means for linking the trailer and auxiliary together as well linking the hauling vehicles together.

The low boy trailer bed 3 has clearances 43 to receive the bed guides 29 of the shovel bed assembly 25, when the shovel bed 27 is positioned over the low boy trailer bed 3. The trailer 1 also has a shaft 45 to receive the grab hook 31 on the shovel bed. It should be noted that while the bed guides, grab hook, clearances, and shaft function together as the means for attaching the trailer 1 and auxiliary 11 together, other mechanisms can be employed to link the bed 27 to the trailer 1 as would be within the skill of the art. For example, the grab hook mechanism 31 on the shovel bed assembly 25 could be configured to latch onto an existing part of the low boy trailer 1 so that a special shaft would not have to be added to the trailer 1. Similarly, the bed assembly 25 could have guides configured to engage existing features of the trailer 1.

The hauling vehicle 19 has a spacing bar assembly 47 that creates and maintains a connection between the vehicle 19 and the vehicle 9 for towing. The spacing bar assembly 47 is shown in the storage position in FIG. 3 and its operation will be described later. The spacing bar assembly should be robust in design so as to maintain the connection between the two vehicles 9 and 19. It should also be capable of maintaining a clearance between the two vehicles when they travel. Preferably, the clearance will be +3 inches. The spacing bar assembly is also made strong enough to avoid imposition of side loads on the gooseneck hitching mechanisms found on the vehicles. This is important since the goosenecks are not designed to handle excessive side loads so that the spacing bar should be robust enough to prevent this from happening.

The hauling vehicle 9 can be equipped with a shaft 49 to provide a locating surface for the spacing bar assembly 47 to connect to the vehicle 9. While an additional 49 shaft is provided to the hitching mechanism 51 of the vehicle 9, the spacing bar assembly could be adapted to connect to an existing part of the hitching mechanism 51 or some other component of the vehicle 9, similar to the attachment described above for the shovel bed assembly 25. In this latter mode, no special adaptation would be required for the vehicle 9.

A sensing assembly 53 is also shown in FIG. 3. This sensing assembly monitors the spacing between the two vehicles and provides a readout to the operator of the vehicle 19 so as to provide a signal to coordinate the steering of the vehicle 1 during hauling. The details of the sensing assembly and its coordination of the operations of the vehicles are discussed below.

FIG. 4 shows the trailer 1 and auxiliary 11 with the shovel bed assembly linked to the trailer 1 and the vehicles 9 and 19 hitched to the trailer 1 and auxiliary 11, respectively, so that the vehicles are ready to haul the load on the trailer 1 and auxiliary. The equipment loaded on the trailer 1 and auxiliary 11 is not shown for clarity purpose. The spacing bar assembly 47 is still shown in the stored position in FIG. 4.

Figure 5:
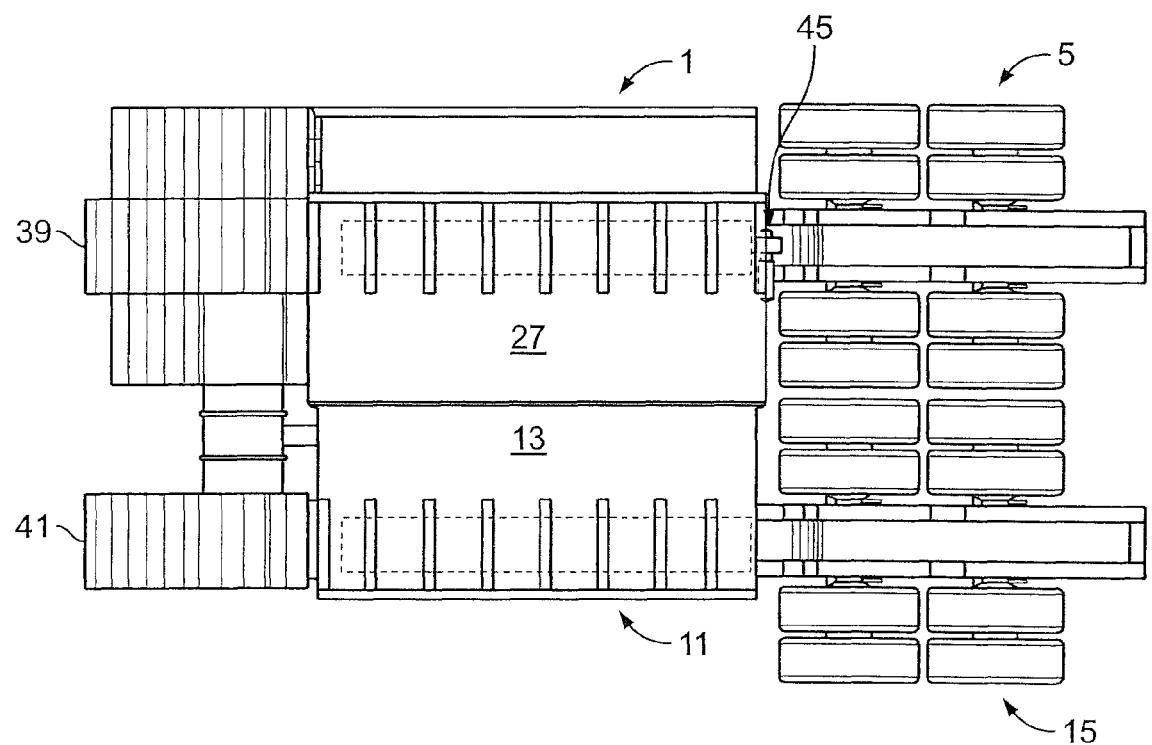
FIG. 5 shows the combination of the trailer auxiliary and the low boy trailer in an attached mode with the ramps in place for equipment loading in the operative position.

FIG. 5 shows the trailer 1 and auxiliary 11 ready for loading but before the hitching of the hauling vehicles 9 and 19. The ramp 39 is shown in the operative position over the hitch 7 of the trailer 1 with ramp 41 shown in the operative position over the hitch 17 of the auxiliary 11. It can be seen here that the ramps align with the center line of each of the trailer 1 and auxiliary 11 so that the load of the equipment to be loaded is centered on the main frame of the trailer 1 and auxiliary 11. FIG. 5 also shows the grab hook 45 latching onto the shaft 49 on the trailer 1.

FIG. 6-9 shows the action of the spacing bar assembly 47 in connecting the vehicles 9 and 19. The spacing bar assembly 47 is made up of telescoping assembly 55 with sliding member 56, a hinge 57, a pivoting mechanism 59 for the hinge, a fixed member 61 with a grab hook 63 on its free end and a grab hook pivoting mechanism 65. In the storage position, see FIG. 8, the telescoping assembly inner member 56 is retracted and the fixed member 61 is pivoted using the mechanism 59 so that it is positioned over the telescoping assembly 55. In the attaching operation, the inner member 56 is telescoped outward using the two outboard slide cylinders 58, see FIG. 6. This telescoping action moves the fixed member 61 and its pivoting mechanism toward the hauling vehicle 9. The fixed member 61 pivots by action of the pivoting mechanism 59, see FIG. 8, so that the grab hook 63 is positioned to grab the shaft 69 mounted to the hitching mechanism of vehicle 9. The grab hook 63 is pivoted using the mechanism 65 to engage the shaft 69 and provide a positive locking of the shaft and secure connection between the vehicles 9 and 19. The advantage of using the grab hook is that it is forgiving in that it does not require the same spacing between the vehicles each time. This is the same principle explained in the grab hook hitching mechanism described in the Smith patent above.

As mentioned above, the sensing assembly 53 works to monitor the spacing between the vehicles. The assembly 53 includes a sensor 71 and a spacing bar 73. The sensor in combination with the spacing bar determines the spacing between the vehicles for a number of purposes. The spacing can be monitored when the vehicles are being aligned for hauling. In addition, spacing can be monitored during the hauling operation for operator control. Knowing the spacing during the hauling operation will allow the operators of the vehicles to make the necessary adjustments in steering, speed, etc. so that the hauling operation functions without problems.

While the sensor is shown on the vehicle 9 and the spacing bar is shown on the vehicle 19, this arrangement could be reversed. In addition, other types of sensing means may be used to determine the spacing between the vehicles.

In the stored position, the telescoping action of the spacing bar assembly 47 is important so that its presence does not interfere with the operation of the vehicle 19 in other uses. For example, if the spacing bar assembly 47 did not employ the hinge feature and the grab hook just extended to the end of the vehicle wheels in the stored position, the spacing bar assembly would likely interfere with the movement of hitching mechanism, since it rotates as is described in the Smith gooseneck patent mentioned above.

The spacing bar assembly 47 also functions as a carrier for the hoses, lifelines, and wires necessary to coordinate the vehicles during operation. Also, each of the vehicles and trailer and auxiliary will have the necessary electronics and other means to coordinate the power application, braking application, lifting at the goosenecks, steering coordination and/or signals to assist the operator the first vehicle 9 to manually steer in formation with the operator of the vehicle 19, which would normally be the lead vehicle since the hoses and wires facilitating control emanate therefrom.

Figure 6:
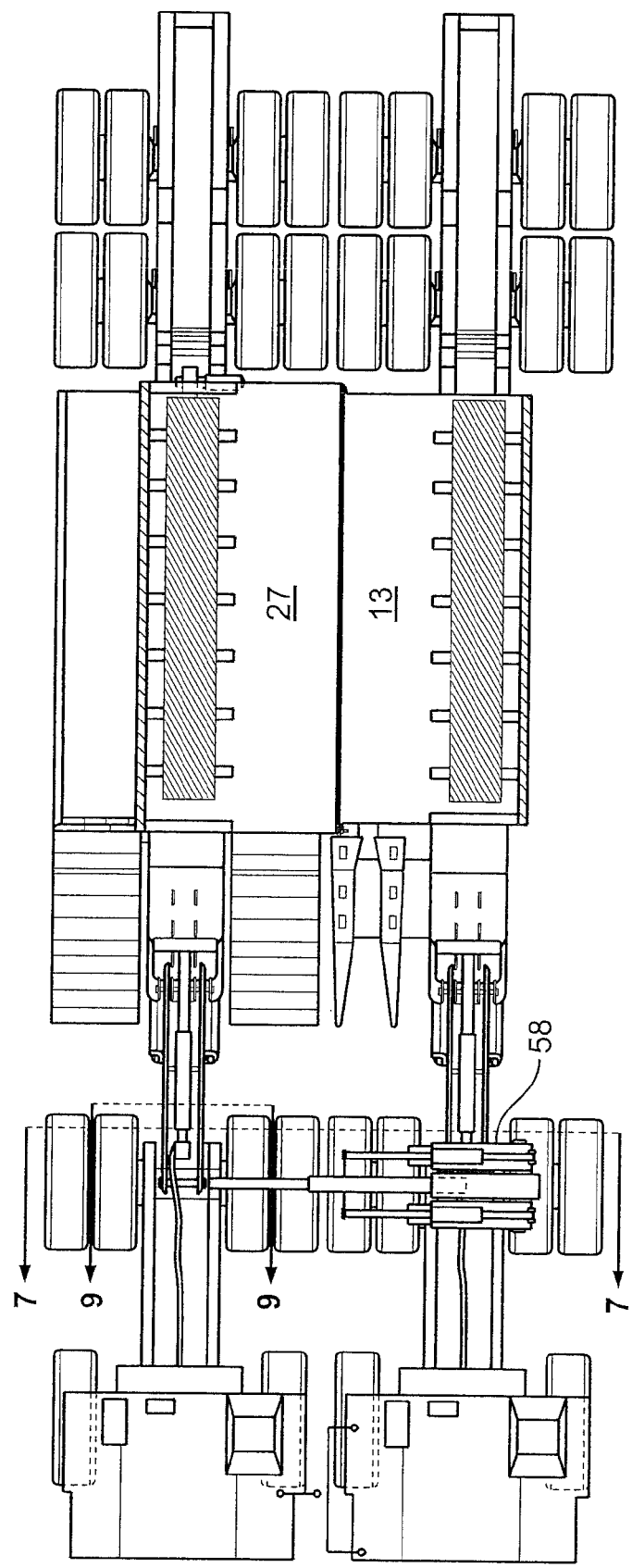
FIG. 6 shows the combination of the trailer auxiliary and the low boy trailer in an attached mode and the hauling vehicles in a connected mode.
Figure 7:
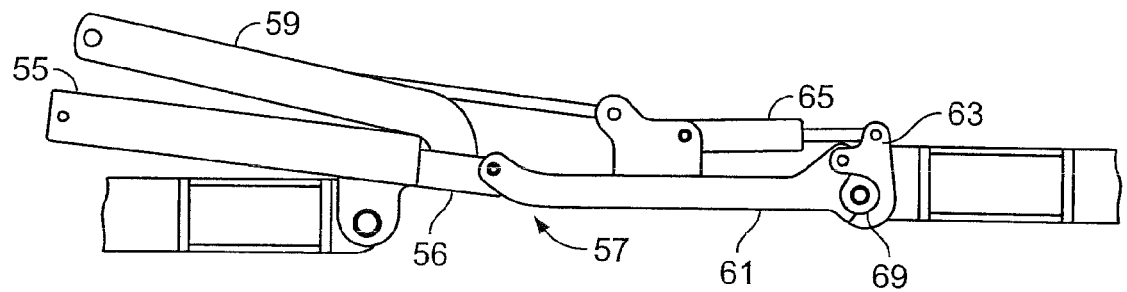
FIG. 7 shows a view along line 7-7 of FIG. 6 of the spacing bar.
Figure 8:
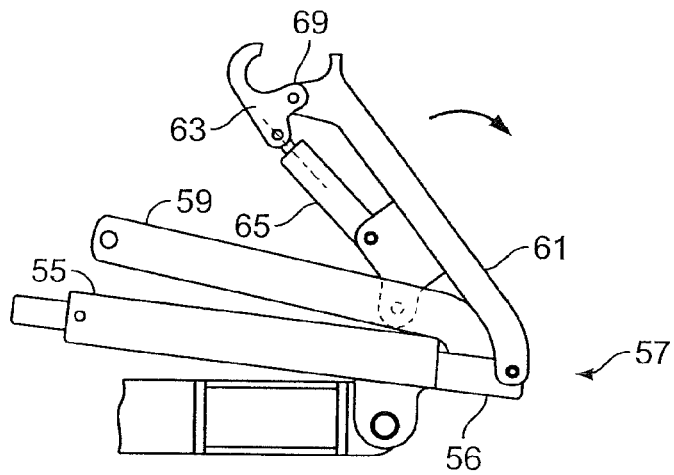
FIG. 8 shows the spacing bar of FIG. 7 in a folded and retracted position.
Figure 9:
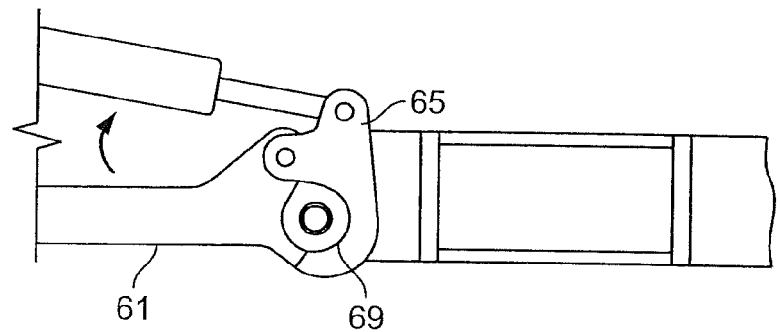
FIG. 9 shows an enlarged view along the line 9-9 of the end of the spacing bar of FIGS. 7 and 8 in connection with the gooseneck of the towing vehicle.

It should be understood that the spacing bar is just one example of a means for connecting the two vehicles for the hauling operation. Other mechanisms could be employed to link the vehicle together so that the trailer 1 and auxiliary 11 can be hauled together to move the high tonnage piece of equipment. Also, while the spacing bar assembly 47 is shown mounted to the hauling vehicle 19, it could be mounted to the vehicle 9 so that the manner of mounting and direction of movement would be reversed. That is, in the FIG. 6 embodiment, the spacing bar assembly is designed to travel away from the driver's side of the vehicle 19 or toward the vehicle 9. If the spacing bar assembly or any other mechanism were employed on vehicle 9, travel of the assembly for linking to the vehicle 19 would occur in the opposite direction as shown in FIG. 6 or toward the vehicle 19 as it sits adjacent to vehicle 9. Also, the spacing bar assembly 47 could be made to rotate 180° so that the vehicle carrying the spacing bar assembly could be used to hitch to either the auxiliary or the trailer.

If necessary, another power unit can be placed on the trailer and/or auxiliary to assist in moving the equipment.

The invention has significant number of advantages over the high tonnage single unit trailers proposed in the past.

Each of the trailer and auxiliary is approximately 24 feet wide, which makes them similar to existing mine equipment. Each of the trailer and auxiliary travels independently and separately, even to the point of loading the high tonnage equipment. The only extreme overwidth situation is when the shovel is actually being transported, e.g., 49 feet, similar to moving a trailer home on a highway.

Using the combination of the trailer and auxiliary, the vehicles and their hitching mechanisms are of standard size (no jeeps as required for the single unit) and each vehicle can be used for all low boy and tow truck applications in the range of 200-800 tons.

The low boy trailer can accommodate normal loads such as 600-800 tons but also functions to move lower tonnage loads, e.g., 400 tons and lower.

The vehicle 19 can be used as a backup for vehicle 9 for moving the trailer 1, or as a tow truck, or to haul lower capacity low boy trailers, 150-300 tons.

By making the auxiliary solely adapted to be carry one half of the heavy equipment load, the cost of the auxiliary is much less than the cost for a fully functional low boy trailer. As can be seen in FIG. 5 for example, the bed 13 of the auxiliary is sized to that it only has to accommodate the load of the heavy equipment over the frame and center line of the auxiliary. The width of the bed is less than the overall width of the auxiliary including the wheels 15. This contrasts with the typical low boy trailer bed width that generally matches the overall width of the trailer as defined by the wheels 5.

In use, the inventive trailer combination can haul a high tonnage piece of heavy equipment by positioning the shovel bed over a main frame of the low boy trailer and linking the shovel bed to the low boy trailer. The ramps are positioned at ends of each of the low boy trailer and low boy trailer auxiliary for loading the piece of heavy equipment on the low boy trailer and low boy trailer auxiliary. A first hauling vehicle is hitched to the low boy trailer and a second hauling vehicle is hitched to the low boy trailer auxiliary. The first and second hauling vehicles are connected together, and the low boy trailer and low boy trailer auxiliary are hauled to a location.

Figure 10:
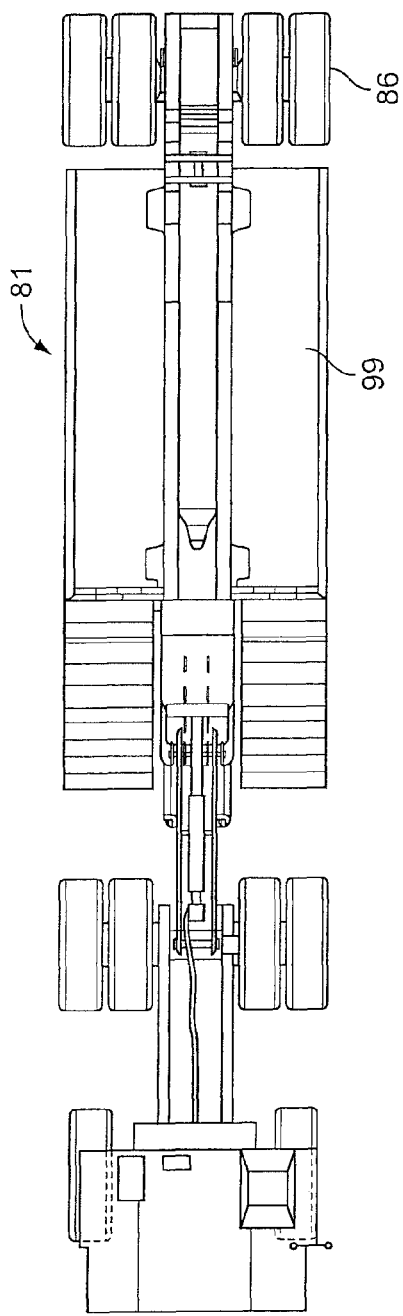
FIG. 10 shows a top view of a low tonnage prior art trailer.
Figure 11:
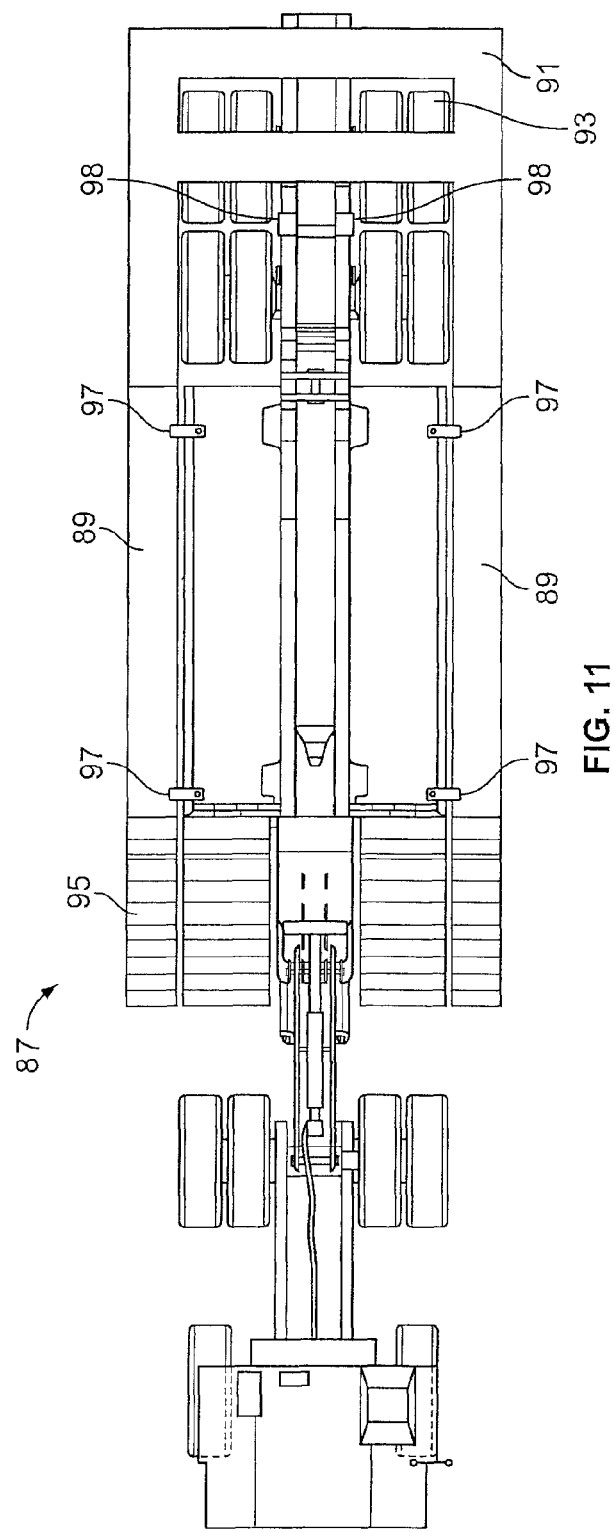
FIG. 11 shows the trailer of FIG. 10 in combination with a u-shaped trailer auxiliary to increase the tonnage capacity of the trailer of FIG. 10.

Referring now to FIGS. 10 and 11, another embodiment of the invention is shown wherein a typical low boy trailer adapted for low tonnage use, e.g., 450 ton use, can be modified so that it can handle larger loads, e.g., 800 ton loads. A low boy trailer 81 is shown in FIG. 10. It should be noted that the low boy trailer 81 differs from the low boy trailer 1 of FIG. 1A in that it has only one rear axle, thus the lower tonnage use.

A trailer auxiliary 87 is shown in FIG. 10, which is essentially u-shaped. The u-shape creates a space intended to receive the low boy trailer 81 as shown. The u-shape of the auxiliary 87 is formed by the sides 89, rear 91, axle assembly 93, and ramps 95. The auxiliary 87 is also equipped with means for linking the auxiliary to the low boy trailer 81. These means are illustrated as a number of grab hook assemblies 97. Four of the grab hook assemblies function to link the sides 89 of the auxiliary 87 to be bed 99 of the trailer 81. Two other grab hook assemblies 98 link the axle assembly 93 to the axle assembly 86 of the trailer 81. In the illustrated embodiment, the grab hooks are on the auxiliary, and either special members on the trailers are provided to receive the grab hooks, or the grab hook assemblies are specially modified to latch onto an existing member of the trailer. While grab hook assemblies are shown mounted to the auxiliary and are illustrated as an example of the means in which to link the trailer 81 and the auxiliary 87, other mechanisms as would be known in the art could also be employed. The advantage of the grab hook is its strong and powerful locking capability. Also, while the grab hook assemblies are described as being on the auxiliary, the main mechanism for linking the two components together could be found on the low boy trailer 81.

By linking the auxiliary 87 to the trailer 81, the tonnage capacity of the trailer 81 is significantly increased. At the same time, this capability is achieved only at the cost of the auxiliary 87, which is much less than if another trailer at a higher tonnage were to be acquired. In the linked state, the combination of the low boy trailer 81 and auxiliary 87 receives the weight of the load being hauled on the bed. If desired, additional support members can be provided between the sides 89 of the auxiliary 87 and the bed 99 of the trailer 81 to further support the load being hauled. For example, one or more support members could be mounted along the length and to the underside of the sides 89. These members could then be extended to engage the low boy trailer beneath the bed 99 to provide additional support during hauling.

Axle assembly 93 can optionally have a suspension to be able to equalize the loads between the axles.

In use of the embodiment of FIGS. 10 and 11, a piece of equipment can be hauled by positioning the low boy trailer inside a space created by the u-shaped auxiliary and linking the low boy trailer to the u-shaped auxiliary, hitching a hauling vehicle to a hitch of the low boy trailer and hauling the low boy trailer and u-shaped auxiliary to a desired location. Of course, equipment can be loaded on the trailer combination once the two components are linked together and prior to the hauling step.

As such, an invention has been disclosed in terms of preferred embodiments thereof which fulfills each and every one of the objects of the present invention as set forth above and provides a new and improved trailer designs for hauling high tonnage equipment.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A u-shaped trailer auxiliary comprising:
   opposing sides,
   a rear section having a width extending between the opposing sides,
   an axle assembly mounted to the rear section, the axle assembly extending across the width of the rear section, and
   means to link the u-shaped trailer auxiliary to a low boy trailer,
   the opposing sides and the rear section forming a u-shape and defining a space between the opposing sides and rear section sized to receive a low boy trailer.

2. The u-shaped trailer auxiliary of claim 1, wherein the linking means are a plurality of grab hook assemblies mounted to the auxiliary trailer, a grab hook of each assembly adapted to engage a member on the low boy trailer for linking purposes.

3. The u-shaped trailer auxiliary of claim 2, wherein the grab hook assemblies are mounted on each side of the u-shaped trailer auxiliary.

4. The u-shaped trailer auxiliary of claim 3, wherein the grab hook assemblies are mounted on a center portion of the rear section of the u-shaped trailer auxiliary.

5. The u-shaped trailer auxiliary of claim 1, wherein the linking means include means to link the u-shaped trailer auxiliary to a center portion of the rear section of the low boy trailer.

6. The u-shaped trailer auxiliary of claim 1, wherein each side of the u-shaped trailer auxiliary includes a ramp.

7. The u-shaped trailer auxiliary of claim 1, wherein the rear section is fixed in width.

8. A method of hauling a piece of equipment comprising:
   providing a low boy trailer,
   providing the u-shaped trailer auxiliary of claim 1,
   positioning the low boy trailer inside a space created by the u-shaped trailer auxiliary and linking the low boy trailer to the u-shaped trailer auxiliary to form a trailer combination, and
   loading the equipment on the trailer combination and hitching a hauling vehicle to a hitch of the low boy trailer and hauling the trailer combination to a location.

9. A trailer combination comprising a low boy trailer and the u-shaped auxiliary of claim 1.

\* \* \* \* \*